(No Model.) 2 Sheets—Sheet 1.

G. R. MELONEY & J. T. CRISWELL.
BUTTER BOX.

No. 481,801. Patented Aug. 30, 1892.

Witnesses
Raymond F. Barnes
W. R. Kennedy

Inventors
G. R. Meloney
J. T. Criswell
By Phil. T. Dodge, Attorney (No Model.) 2 Sheets—Sheet 2.
G. R. MELONEY & J. T. CRISWELL.
BUTTER BOX.
No. 481,801. Patented Aug. 30, 1892.
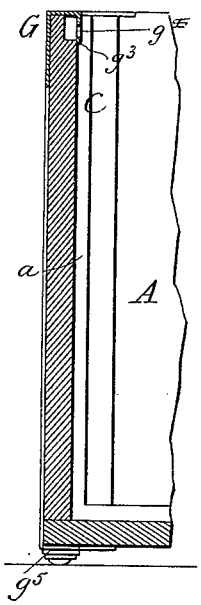
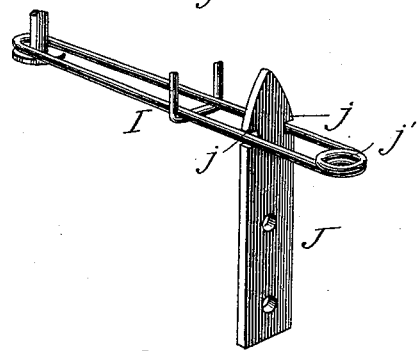
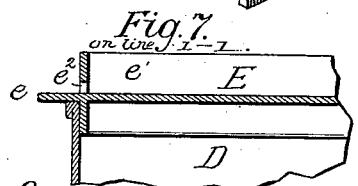
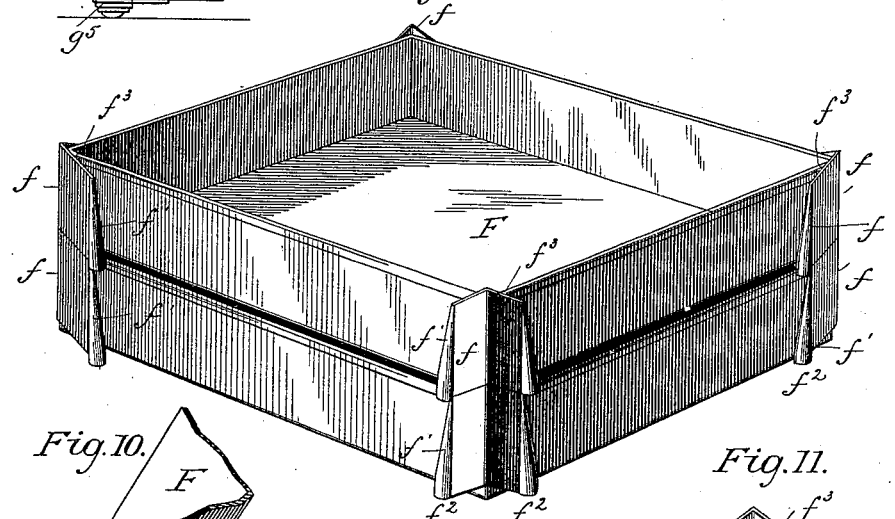
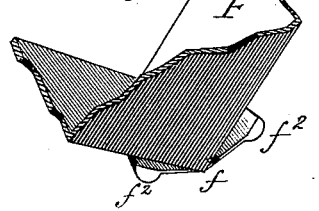
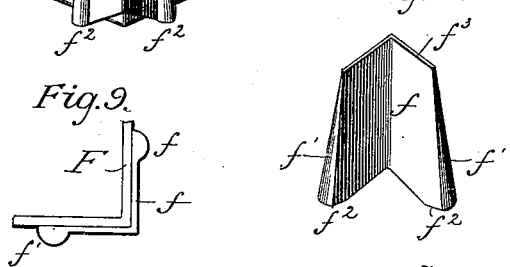

UNITED STATES PATENT OFFICE.

GEORGE R. MELONEY AND JOEL T. CRISWELL, OF PHILADELPHIA, PENNSYLVANIA.

BUTTER-BOX.

SPECIFICATION forming part of Letters Patent No. 481,801, dated August 30, 1892.

Application filed November 30, 1891. Serial No. 413,512. (No model.)

*To all whom it may concern:*

Be it known that we, GEORGE R. MELONEY and JOEL T. CRISWELL, of Philadelphia, county of Philadelphia, and State of Pennsylvania, have invented a new and useful Improvement in Butter-Boxes, of which the following is a specification.

Our invention relates to that class of butter boxes or chests wherein a series of removable trays are arranged one above another within a box or chest, which is also adapted to receive ice or other cooling medium.

The invention consists in various details of construction hereinafter described.

Figure 1:
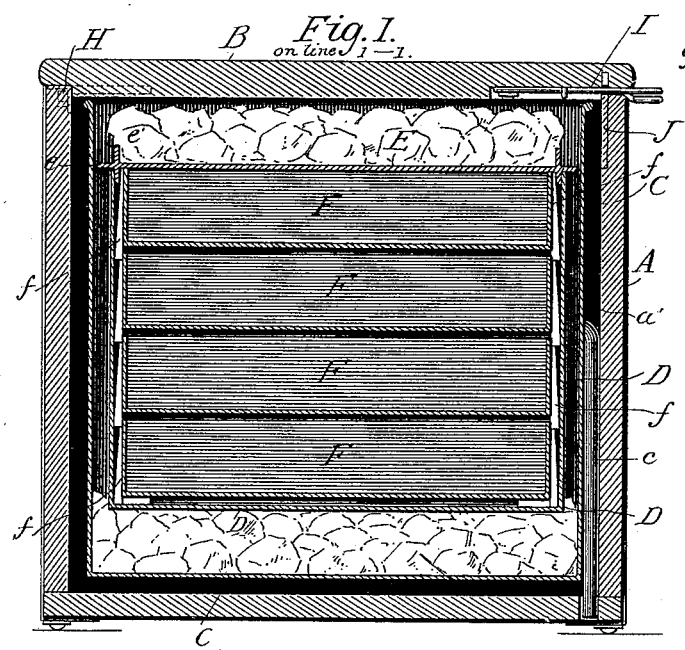
Figure 3:
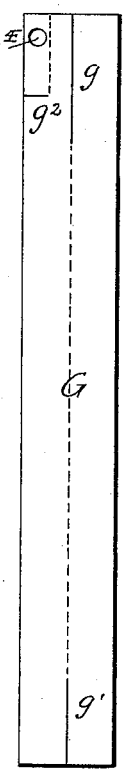
Figure 2:
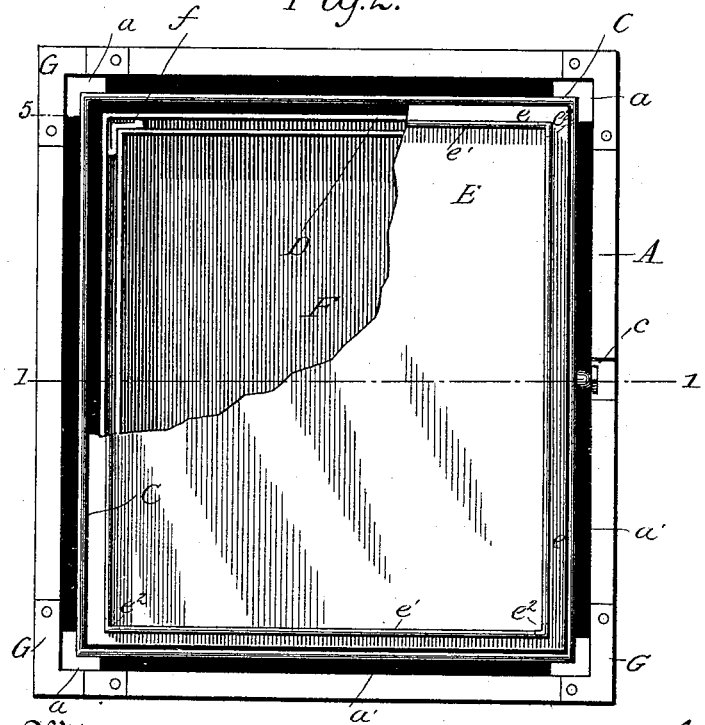
Figure 4:
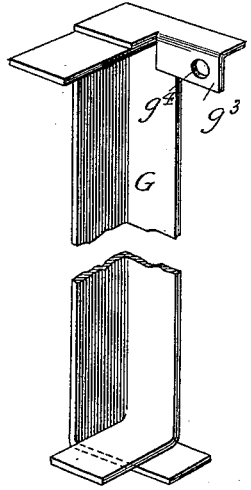

In the accompanying drawings, Figure 1 is a vertical cross-section of our improved box on the line 1 1 of Fig. 2. Fig. 2 is a top plan view of the box with the outer lid removed and a portion of the inner lid broken away. Figs. 3 and 4 are views illustrating the construction of the corner-strips. Fig. 5 is a vertical section through one corner of the box on the line 5 5. Fig. 6 is a perspective view of the lid-fastening device. Fig. 7 is an enlarged section on the line 1 1 of Fig. 2. Fig. 8 is a perspective view showing two of the trays arranged in operative relations. Fig. 9 is a top plan view of one corner of the tray. Fig. 10 is a perspective view of one corner of the tray as seen from the under side. Fig. 11 is a perspective view of one of the corner-pieces.

Referring to the drawings, A represents a strong rectangular box or chest constructed of wood or other suitable material and provided with a removable wooden lid B, the edges of which are rabbeted or shouldered so that it may engage slightly within the walls to resist lateral strain.

C represents a tight sheet-metal vessel or lining removably inserted within and substantially filling the interior of the box A, the latter being provided, however, within its corners and at its bottom with strips $a$, which slightly separate the metal vessel from the surrounding box in order to leave a continuous air-space $a'$ between them. The inner vessel C is provided on one side with an overflow-pipe $c$, discharging through an opening in the bottom of the box A for the purpose of carrying away the surplus water.

D represents a second sheet-metal box or vessel adapted to fit removably within the outer vessel C, but of a considerably less depth to leave room for the ice or other refrigerant above and below it. This vessel D is provided with a removable lid E, by which it is tightly closed, the lid having an end flange $e$, fitting within the vessel, and a top flange $e'$ to retain the ice thereon. Openings $e^2$ are provided at the corners so that the water may escape from the lid and flow downward over the outside of the vessel D into the outer vessel C.

F F are a series of sheet-metal trays consisting each of a tight bottom with side walls rising therefrom. These trays are provided with angular corner-pieces $f$, of galvanized cast-iron or other suitable material, secured rigidly to them. Each of these corner-pieces is adapted to fit around the corner and bear upon the two sides of the tray and is provided at each edge with an outwardly-extending vertical rib $f'$, these ribs being intended to bear against the vertical walls of the vessel D in order to maintain a separation between the vessel and the trays that the air may circulate freely. Each of the corner-pieces is extended downward at its edges, as at $f^2$, below the bottom of the tray in order that it may overlap the upper edge of the tray below, and thus keep the trays firmly in position one upon another. Each corner-piece has its upper edges beveled downward below the edge of the tray, as shown at $f^3$, and this in order that the corner-piece of the tray above may fit downward and rest upon the lower corner-piece, thus causing the entire weight of the trays and their contents to be carried by the corner-pieces, which also maintain a slight vertical separation between the trays to facilitate the circulation of the cold air.

The essential features of the invention as regards the corner-piece are the projecting ribs $f'$, the downwardly-extended corners $f^2$, and the depressed upper edges $f^3$ to effect the interlocking and supporting action between the trays.

As the boxes are roughly handled in practice and subjected to severe strains, it is necessary that they shall be made of great strength, that the lid shall be held securely in place upon them, and that the parts shall be tied together so as to distribute the strains.

To this end we apply to each corner of the box vertical strengthening-pieces G, such as shown in Figs. 3 and 4, each consisting of a strip of sheet metal having the longitudinal incisions $g$ and $g'$ and the transverse incision $g^2$. This strip is folded longitudinally through the middle, so that its two sides stand at right angles to each other, after which the lower ends are bent at right angles one across the other, as shown in Fig. 4, so that they stand in a horizontal position to rest beneath the bottom of the wooden box. The upper ends are in like manner bent to a horizontal position, so as to overlap each other, in order to rest on the upper edges of the box. The portion lying beyond the transverse incision $g^2$ is also bent downward or inward to a vertical position, as shown at $g^3$, in order to bear on the inner vertical surface of the box, and is provided with a hole $g^4$ to form a socket for one of the lid-retaining fingers to be presently referred to. The corner-piece, formed as above, is applied to the corner of the box, as shown in Figs. 1 and 2, and nailed firmly thereto, a washer $g^5$ being usually introduced between the lower ends, as shown in Fig. 5, in order to elevate the wooden bottom above wet surfaces on which the box may be placed.

We are aware that sheet-metal strengthening-strips have been variously applied to the corners of chests and boxes, and we therefore lay no broad claim thereto, our invention being limited to a corner-piece in which the ends are lapped upon each other and upon the horizontal surfaces of the box, as herein shown.

The lid of the box is provided with strong plates or fingers H, the rear ends of which are projected outward or rearward below the surface of the lid in suitable position to be thrust into the socket $g^4$ of the corner-strips above described. When, therefore, the lid is applied to the box, any strain tending to remove the lid is communicated to the strengthening-strips, and thereby distributed over the box, instead of being concentrated upon a single part or at a single point. The result is that the parts are less liable to be separated or displaced.

For the purpose of securing the lid at the front we provide the fastening device I, consisting of two horizontal laterally-moving fingers secured to the lid and adapted to embrace the pointed or spear-shaped upper end of a plate J, which is secured vertically to the inside of the box. When the lid is shut down upon the box, the two arms of the fastening I are forced apart by the pointed end of the plate J until they finally spring beneath its shoulders $j$, thereby holding the lid down in place. The outer ends of the arms are so shaped that they may be readily separated by hand, in order to release the lid, and are formed with openings $j'$, through which a bow of a padlock may be passed to prevent their disengagement.

We commonly construct the fastening I of a single piece of strong steel wire bent into the shape represented in the drawings; but it may obviously be made of sheet metal or other suitable material.

Having thus described our invention, what we claim is—

1. The combination, with the box A, of the corner-piece G, formed of a strip of sheet metal bent through its length into angular form and having its ends incised or split and bent down at right angles to the body portion, the two leaves of each end crossing each other to form double end walls, as shown and described.

2. The combination, with the box A, of the corner-piece G, formed of a strip of sheet metal bent through its length into angular form and having its ends incised or split and bent down at right angles to the body portion, the two leaves of each end crossing each other, the upper end being incised laterally and the portion beyond the incision bent downward against the inner side of the box.

3. In a butter-box, the combination of an outer inclosing vessel, an inner vessel smaller than the inclosing vessel, with an open space between the two, a lid for the inner vessel, projecting horizontally to the walls of the inclosing vessel to retain and hold the inner vessel in proper position, and a series of superposed trays within the inner vessel, substantially as shown and described.

4. In combination with an inclosing vessel, a series of trays provided with angular corner-pieces having at their vertical edges ribs or projections $f'$, projecting against the walls of the inclosing vessel to hold the trays in proper position, substantially as shown and described.

5. In a butter-box, a tray having corner-pieces $f$, with their upper edges dropped below the top of the tray and their lower edges extended below the bottom of the tray.

In testimony whereof we have hereunto set our hands this 27th day of June, 1891, in the presence of two attesting witnesses.

GEORGE R. MELONEY.
JOEL T. CRISWELL.

Witnesses:
GEORGE VAUX, Jr.,
WILLIAM J. DICKSON.